(12) United States Patent
Kwon

(10) Patent No.: US 11,894,538 B2
(45) Date of Patent: Feb. 6, 2024

(54) FUEL CELL-BATTERY SYSTEM AND CONTROL METHOD THEREOF

(71) Applicants: HYUNDAI MOTOR COMPANY, Seoul (KR); KIA CORPORATION, Seoul (KR)

(72) Inventor: Woo Jung Kwon, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 173 days.

(21) Appl. No.: 17/239,256

(22) Filed: Apr. 23, 2021

(65) Prior Publication Data

US 2022/0181721 A1 Jun. 9, 2022

(30) Foreign Application Priority Data

Dec. 7, 2020 (KR) .......................... 10-2020-0169191

(51) Int. Cl.
| | |
|---|---|
| H01M 10/66 | (2014.01) |
| H01M 16/00 | (2006.01) |
| H01M 10/613 | (2014.01) |
| H01M 10/6567 | (2014.01) |
| H01M 8/04082 | (2016.01) |
| H01M 8/04029 | (2016.01) |
| H01M 8/04701 | (2016.01) |
| H01M 10/633 | (2014.01) |

(Continued)

(52) U.S. Cl.
CPC ............ *H01M 10/66* (2015.04); *B60L 58/40* (2019.02); *H01M 8/04029* (2013.01); *H01M 8/04037* (2013.01); *H01M 8/04201* (2013.01); *H01M 8/04373* (2013.01); *H01M 8/04708* (2013.01); *H01M 8/04731* (2013.01); *H01M 10/613* (2015.04); *H01M 10/615* (2015.04); *H01M 10/625* (2015.04); *H01M 10/633* (2015.04); *H01M 10/6567* (2015.04); *H01M 10/663* (2015.04); *H01M 16/006* (2013.01); *H01M 8/04208* (2013.01); *H01M 2220/20* (2013.01); *H01M 2250/20* (2013.01)

(58) Field of Classification Search
None
See application file for complete search history.

(56) References Cited

U.S. PATENT DOCUMENTS 10,322,617 B2 6/2019 Kohl et al.

FOREIGN PATENT DOCUMENTS

| DE | 60018321 T2 | * | 4/2006 |
| DE | 102012204819 A1 | * | 9/2013 |

(Continued)

*Primary Examiner* — Jonathan Crepeau
(74) *Attorney, Agent, or Firm* — Lempia Summerfield Katz LLC

(57) ABSTRACT

A fuel cell-battery system includes: a battery module including a battery that stores electric power and a coolant line through which coolant circulates to cool the battery; a fuel cell module including a hydrogen tank that stores hydrogen, a fuel cell that produces the electric power using the hydrogen, and a hydrogen line that connects the hydrogen tank and the fuel cell to deliver the hydrogen from the hydrogen tank to the fuel cell; and a heat exchange module through which the coolant line and the hydrogen line pass such that the coolant is cooled by heat exchange with the hydrogen and the hydrogen is heated by heat exchange with the coolant.

11 Claims, 7 Drawing Sheets

(51) Int. Cl.
*H01M 10/615* (2014.01)
*H01M 10/663* (2014.01)
*H01M 10/625* (2014.01)
*H01M 8/0432* (2016.01)
*H01M 8/04007* (2016.01)
*B60L 58/40* (2019.01)

(56) References Cited

FOREIGN PATENT DOCUMENTS

DE 102107000802 A1 * 8/2018
JP 2009212066 A 9/2009

* cited by examiner

FUEL CELL-BATTERY SYSTEM AND CONTROL METHOD THEREOF

CROSS-REFERENCE TO RELATED APPLICATION

This application claims the benefit of priority to Korean Patent Application No. 10-2020-0169191, filed in the Korean Intellectual Property Office on Dec. 7, 2020, the entire contents of which are incorporated herein by reference.

TECHNICAL FIELD

The present disclosure relates to a fuel cell-battery system and a control method thereof.

BACKGROUND

A fuel cell produces electric power using a fuel containing hydrogen and a gas containing oxygen. For the purpose of stabilization of output, the electric power produced by the fuel cell may be stored in a battery that is an electrical energy storage device such as a secondary cell, a capacitor, or the like.

The battery and the fuel cell may be cooled through a common coolant line. However, in general, a battery system and a fuel cell system are separately configured. The battery system and the fuel cell system have separate coolant lines and cool circulating coolants using separate cooling devices. In the case of configuring the separate cooling systems, the number of components may be increased, and generated heat may not be efficiently used.

SUMMARY

The present disclosure has been made to solve the above-mentioned problems occurring in the prior art while advantages achieved by the prior art are maintained intact.

An aspect of the present disclosure provides a fuel cell-battery system for efficiently performing heat exchange and supplying coolant and fuel at appropriate temperatures. Another aspect of the present disclosure provides a method for controlling the fuel cell-battery system.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a fuel cell-battery system includes a battery module including a battery that stores electric power and a coolant line through which coolant circulates to cool the battery. The system further includes a fuel cell module including a hydrogen tank that stores hydrogen, a fuel cell that produces the electric power using the hydrogen, and a hydrogen line that connects the hydrogen tank and the fuel cell to deliver the hydrogen from the hydrogen tank to the fuel cell. The system further includes heat exchange module through which the coolant line and the hydrogen line pass such that the coolant is cooled by heat exchange with the hydrogen and the hydrogen is heated by heat exchange with the coolant.

According to another aspect of the present disclosure, a method is provided for controlling a fuel cell-battery system that includes: a battery module that cools a battery storing electric power by using coolant; a fuel cell module that heats hydrogen and supplies the heated hydrogen to a fuel cell that produces the electric power using the hydrogen; and a heat exchange module through which the coolant and the hydrogen exchange heat with each other. The method includes: obtaining temperature of the coolant released from the battery; passing the coolant through the heat exchange module to cool the coolant, when the temperature of the coolant is higher than a target coolant temperature; and passing the coolant through a heater, when the temperature of the coolant is lower than or equal to the target coolant temperature. The passing of the coolant through the heater includes operating the heater, when the temperature of the coolant is lower than the target coolant temperature.

According to another aspect of the present disclosure, a method is provided for controlling a fuel cell-battery system that includes: a battery module that cools a battery storing electric power by using coolant; a fuel cell module that heats hydrogen stored in a hydrogen tank using an external heat exchanger and supplies the heated hydrogen to a fuel cell that produces the electric power using the hydrogen; and a heat exchange module through which the coolant and the hydrogen exchange heat with each other. The method includes: obtaining temperature of the hydrogen passing through the external heat exchanger; returning the hydrogen to the hydrogen tank to cool the hydrogen, when the temperature of the hydrogen is higher than or equal to an upper limit of a target hydrogen temperature range; and returning the hydrogen to the external heat exchanger to heat the hydrogen, when the temperature of the hydrogen is lower than or equal to a lower limit of the target hydrogen temperature range.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
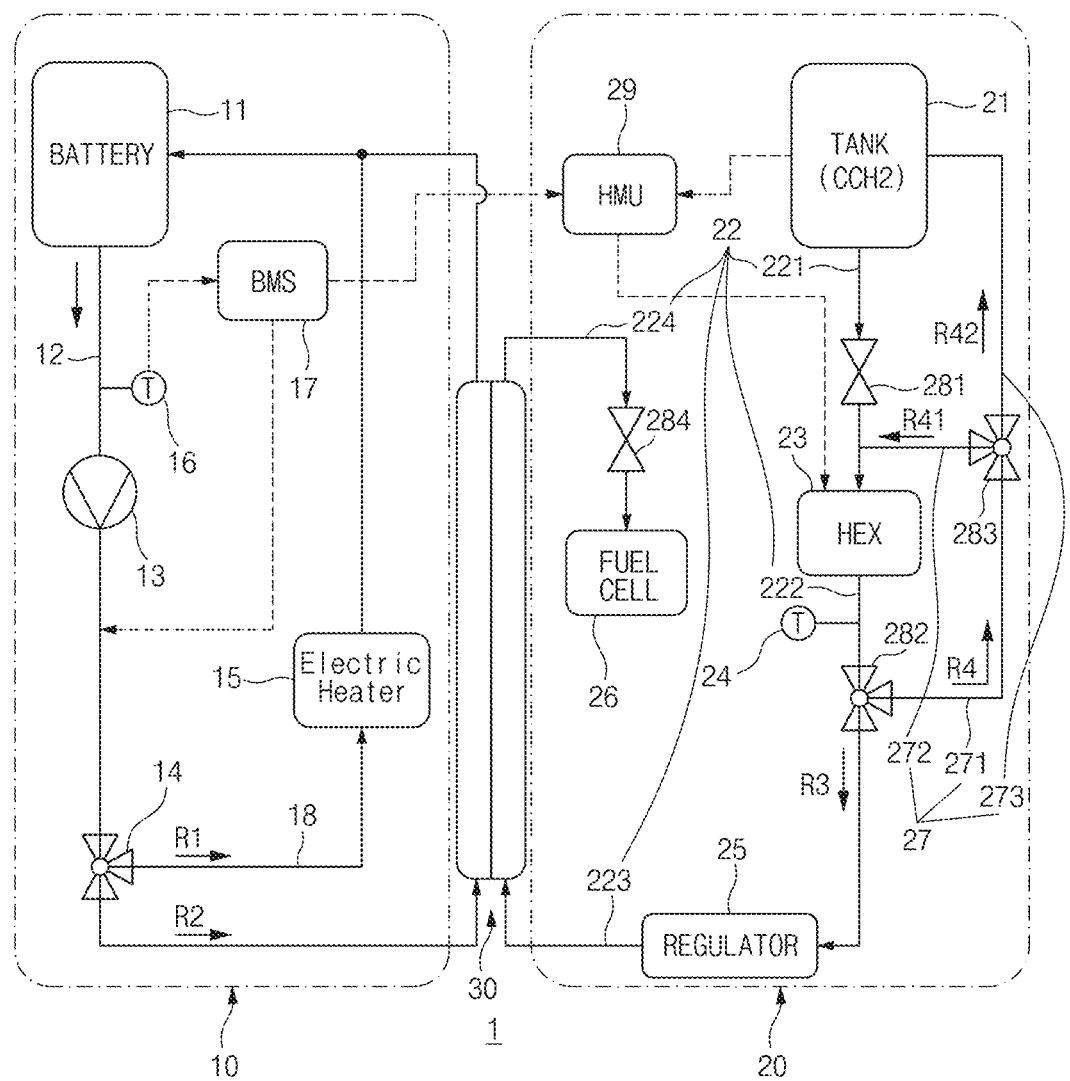
FIG. 1 is a schematic view of a fuel cell-battery system according to a first embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, this may mean the components are not only directly "connected", "coupled", or "linked" but also are indirectly "connected", "coupled", or "linked" via a third component.

First Embodiment

FIG. 1 is a schematic view of a fuel cell-battery system 1 according to a first embodiment of the present disclosure.

Referring to FIG. 1, the fuel cell-battery system 1 according to the first embodiment of the present disclosure includes a battery module 10, a fuel cell module 20, and a heat exchange module 30. In FIG. 1, solid lines may represent connection relationships for fluid flows, and dashed lines may mean directions in which information is transferred.

Battery Module 10

The battery module 10 includes a battery 11 that stores electric power and components that cool the battery 11 to maintain the battery 11 in a stable temperature range. The stable temperature range of the battery 11 may be from 0° C. to 40° C. The battery module 10 may include the battery 11 and a coolant line 12. The battery module 10 may further include a pump 13, a battery valve 14, a heater 15, a heating line 18, a coolant temperature acquisition device 16, and a battery controller 17. The components of the battery module 10 may be embedded in a case of the battery module 10. The battery module 10 may further include a battery temperature acquisition device that obtains the temperature of the battery 11. The battery temperature acquisition device may be electrically connected with the battery controller 17 and may transfer the obtained temperature in the form of an electrical signal to the battery controller 17.

The battery 11, which stores electric power, may be a secondary cell or a capacitor that can be charged and discharged. However, no special limitation applies to the type of the battery 11, as long as it can be repeatedly charged and discharged.

The coolant line 12 is provided such that coolant for cooling the battery 11 circulates through the coolant line 12. The coolant line 12 may be implemented with a pipe through which fluid flows. However, the type of member with which the coolant line 12 is implemented is not limited thereto. Components described as lines in the specification of the present disclosure may be implemented with members identical to, or similar to, the coolant line 12.

The coolant line 12 may form a closed circuit including the battery 11 such that the coolant released from the battery 11 is cooled while being circulated through the coolant line 12 and is delivered to the battery 11 again. The coolant cooled by the coolant line 12 may be supplied to the battery 11, and the heated coolant may be released from the battery 11. Accordingly, the battery 11 may be smoothly operated. The coolant line 12 may pass through the heat exchange module 30 such that the coolant flowing in the coolant line 12 is cooled.

The coolant line 12 may be equipped with the pump 13. The pump 13 may forcibly move the coolant along the coolant line 12 to circulate the coolant. In FIG. 1, the pump 13 is illustrated as being located downstream of the battery 11 with respect to the direction in which the coolant is released from the battery 11. However, the position of the pump 13 is not limited thereto.

The battery module 10 may further include the heater 15 and the heating line 18. The heater 15 may be disposed to heat the coolant. The heater 15 may include a heat source that generates heat by burning a fuel or by using electric power. The heater 15 may transfer heat generated from the heat source to the coolant flowing along the heating line 18. Accordingly, the heating line 18 may be formed to pass through the heater 15. The heating line 18 may be connected to one point and another point of the coolant line 12 and may deliver the coolant from the one point to the other point. With respect to the direction in which the coolant flows, the one point may be located upstream of the heat exchange module 30, and the other point may be located downstream of the heat exchange module 30. The coolant bypassed to the heating line 18 may be heated by the heater 15.

The battery valve 14 may be disposed at the one point. The battery valve 14 may allow the coolant released from the battery 11 to flow into the heat exchange module 30 along the coolant line 12 or flow into the heater 15 along the heating line 18. The battery valve 14, which determines the path of the coolant, may be a three-way valve.

The battery module 10 may include the coolant temperature acquisition device 16 that obtains the temperature of the coolant released from the battery 11. The coolant temperature acquisition device 16 may be, but is not limited to, a thermocouple or a thermistor for obtaining the temperature of the coolant. The coolant temperature acquisition device 16 may be electrically connected with the battery controller 17 and may transfer the obtained temperature in the form of an electrical signal to the battery controller 17.

The battery controller 17 may be electrically connected with the components of the battery module 10 and may be electrically connected with a fuel cell controller 29, which is described below, to perform control. The battery controller 17 may be a battery management system (BMS). The battery controller 17 may be a component including an element capable of a logic operation of executing a control command. The battery controller 17 may include a central processing unit (CPU). The battery controller 17 may be connected to various types of components and may transfer signals depending on control commands to the respective components. The battery controller 17 may be connected to various sensors or acquisition devices and may receive obtained information in a signal form. In the first embodiment of the present disclosure, the battery controller 17 may be electrically connected to the coolant temperature acquisition device 16, the battery valve 14, the heater 15, and the pump 13 that are included in the battery module 10. As the battery controller 17 is electrically connected with the components, the battery controller 17 may be wiredly connected with the components or may further include a communication module capable of wireless communication to communicate with the components.

The battery module 10 may further include a storage medium, and control commands executed by the battery controller 17 may be stored in the storage medium and may be used. The storage medium may be, but is not limited to, a device such as a hard disk drive (HDD), a solid state drive (SSD), a server, a volatile medium, a non-volatile medium, or the like. In addition, data required for the battery controller 17 to perform tasks may be additionally stored in the storage medium.

When the temperature of the coolant obtained by the coolant temperature acquisition device 16 is higher than a target coolant temperature, the battery controller 17 may perform control such that the coolant flows along the coolant line 12 and the heater 15 stops operating. In contrast, when the temperature of the coolant is lower than the target coolant temperature, the battery controller 17 may perform control such that the coolant flows along the heating line 18 and the heater 15 operates. The battery controller 17 may control the battery valve 14 and the heater 15 to perform the controls. Through the controls, the coolant having a temperature higher than the target coolant temperature may be delivered to the heat exchange module 30 through the coolant line 12 and may be supplied to the battery 11 after cooled by the heat exchange module 30. The coolant having a temperature lower than the target coolant temperature may be delivered to the heater 15 through the heating line 18 and may be supplied to the battery 11 after heated by the heater 15. Accordingly, the coolant having a small temperature difference from the target coolant temperature appropriate for operation of the battery 11 may be supplied to the battery 11.

When the obtained coolant temperature is equal to the target coolant temperature, the battery controller 17 may control the battery valve 14 such that the coolant flows along the heating line 18 and may perform control such that the heater 15 stops operating. This is because it is not necessary to heat or cool the coolant having a temperature equal to the target coolant temperature.

Meanwhile, when the obtained coolant temperature is within a target coolant temperature range containing the target coolant temperature, the battery controller 17 may determine that the obtained coolant temperature is equal to the target coolant temperature and may perform control. In this case, when the obtained coolant temperature is higher than or equal to the upper limit of the target coolant temperature range, the battery controller 17 may control the battery valve 14 such that the coolant flows to the heat exchange 30. When the coolant temperature obtained is lower than or equal to the lower limit of the target coolant temperature range, the battery controller 17 may control the battery valve 14 such that the coolant flows to the heater 15 through the heating line 18.

The battery controller 17 may receive the obtained coolant temperature from the coolant temperature acquisition device 16 and may calculate the target coolant temperature, based on the obtained coolant temperature.

Fuel Cell Module 20

The fuel cell module 20 includes a fuel cell device 26 that produces electric power using hydrogen and components that heat the hydrogen to an appropriate temperature and deliver the heated hydrogen to the fuel cell device 26. The fuel cell module 20 may include the fuel cell device 26, a hydrogen tank 21, and a hydrogen line 22. The fuel cell module 20 may further include an external heat exchanger 23, a return line 27, a hydrogen temperature acquisition device 24, the fuel cell controller 29, a tank valve 281, a return valve 282, a return branch valve 283, and a fuel cell valve 284. The components of the fuel cell module 20 may be embedded in a case of the fuel cell module 20.

The hydrogen tank 21 stores the hydrogen. The hydrogen tank 21 may include a hydrogen reservoir in which the hydrogen is stored. The hydrogen stored in the hydrogen tank 21 may be cryo-compressed hydrogen, and the hydrogen tank 21 may be a cryo-compressed hydrogen storage that stores the cryo-compressed hydrogen. The hydrogen may be stored in the hydrogen tank 21 in a cryogenic state of about 38K.

The hydrogen tank 21 may include an internal heat exchanger for adjusting the pressure in the hydrogen tank 21. The internal heat exchanger may allow the hydrogen reservoir and an introduced material to exchange heat with each other.

The fuel cell device 26 produces electric power using the hydrogen. The fuel cell device 26 may be a fuel cell stack constituted by a plurality of stacked fuel cells. Each of the fuel cells may have gas diffusion layers, catalyst layers, and a membrane electrode assembly including an electrolyte membrane. The membrane electrode assembly may be surrounded by separators on both sides. A fuel containing hydrogen may be supplied to an anode of the fuel cell device 26, and a gas containing oxygen may be supplied to a cathode of the fuel cell device 26. The fuel cell device 26 may produce electric power using the supplied fuel and gas.

The fuel cell valve 284 may be disposed upstream of the fuel cell device 26 with respect to the direction in which the hydrogen flows. The fuel cell valve 284 may be opened or closed to determine whether to deliver the hydrogen to the fuel cell device 26.

The hydrogen line 22 connects the hydrogen tank 21 and the fuel cell device 26 to deliver the hydrogen from the hydrogen tank 21 to the fuel cell device 26. The hydrogen may be heated to a final target hydrogen temperature by the heat exchange module 30 while passing through the hydrogen line 22 and may be delivered to the fuel cell device 26.

The hydrogen line 22 may be equipped with the hydrogen tank 21, the external heat exchanger 23, a regulator 25, the heat exchange module 30 and the fuel cell device 26. Portions of the hydrogen line 22 may connect these components. Specifically, a first hydrogen line 221 may connect the hydrogen tank 21 and the external heat exchanger 23. A second hydrogen line 222 may connect the external heat exchanger 23 and the regulator 25. A third hydrogen line 223 may connect the regulator 25 and the heat exchange module 30. A fourth hydrogen line 224 may connect the heat exchange module 30 and the fuel cell device 26. The hydrogen lines 221, 222, 223, and 224 may be connected together to form the integrated hydrogen line 22 or may be connected through the components to form the hydrogen line 22.

The tank valve 281 may be disposed downstream of the hydrogen tank 21 with respect to the direction in which the hydrogen flows. The tank valve 281 may be a solenoid valve. The tank valve 281 may be opened or closed to determine whether to deliver the hydrogen from the hydrogen tank 21 to the fuel cell device 26 through the hydrogen line 22.

The external heat exchanger 23 firstly heats the hydrogen flowing along the hydrogen line 22. The external heat exchanger 23 may be disposed on the hydrogen line 22 between the heat exchange module 30 and the hydrogen tank 21. The external heat exchanger 23 may heat the hydrogen such that the temperature of the hydrogen reaches a predetermined hydrogen supply temperature. For the heating of the hydrogen, the external heat exchanger 23 may be electrically connected with and controlled by the fuel cell controller 29 that is described below. The hydrogen supply temperature may range from 30K to 358K. The external heat exchanger 23 may be, but is not limited to, an electric heater that generates heat using electric power applied thereto or a device that exchanges heat with a fluid stored outside.

The regulator 25 may reduce the pressure of the hydrogen flowing in the hydrogen line 22 through the external heat exchanger 23 to locate the pressure of the hydrogen to be supplied to the fuel cell device 26 within a predetermined pressure range. To this end, the regulator 25 may be disposed in the hydrogen line 22 and may be located between the external heat exchanger 23 and the heat exchange module 30. The regulator 25 may be, but is not limited to, a pressure-reducing valve.

The fuel cell module 20 may include the hydrogen temperature acquisition device 24 that obtains the temperature of the hydrogen released from the external heat exchanger 23. The hydrogen temperature acquisition device 24 may be, but is not limited to, a thermocouple or a thermistor for obtaining the temperature of the hydrogen. The hydrogen temperature acquisition device 24 may be electrically connected with the fuel cell controller 29 and may transfer the obtained temperature in the form of an electrical signal to the fuel cell controller 29.

The fuel cell module 20 may include the return line 27. The return line 27 may return the hydrogen passing through the external heat exchanger 23 to an upstream side of the external heat exchanger 23 with respect to the direction in which the hydrogen flows in the hydrogen line 22. The hydrogen may be post-processed by using the return line 27 such that the temperature of the hydrogen reaches the hydrogen supply temperature.

Whether to return the hydrogen to the return line 27 or whether to deliver the hydrogen to the fuel cell device 26 along the hydrogen line 22 may be determined by opening or closing the return valve 282. The return valve 282 may be disposed at the point where the return line 27 is connected to the hydrogen line 22. The return valve 282 may be a three-way valve.

The return line 27 may include a basic return line 271 that receives the hydrogen from the hydrogen line 22 and returns the hydrogen along a fourth flow path R4, a cooling return line 273 that returns the hydrogen to the internal heat exchanger, and a heating return line 272 that returns the hydrogen from the hydrogen line 22 to a point between the external heat exchanger 23 and the hydrogen tank 21. The cooling return line 273 and the heating return line 272 may branch off from the basic return line 271 as flow path 4-2 R42 and flow path 4-1 R41.

The return branch valve 283 may be disposed at the point where the cooling return line 273 and the heating return line 272 branch off from the basic return line 271. Whether to deliver the hydrogen to the cooling return line 273 or whether to deliver the hydrogen to the heating return line 272 may be determined by opening or closing the return branch valve 283. The return branch valve 283 may be a three-way valve.

The fuel cell controller 29 may be electrically connected with the components of the fuel cell module 20 and may be electrically connected with the battery controller 17 to perform control. The fuel cell controller 29 may be a hydrogen storage system management unit (HMU). The fuel cell controller 29 may be a component including an element capable of a logic operation of executing a control command. The fuel cell controller 29 may include a central processing unit (CPU). The fuel cell controller 29 may be connected to various types of components and may transfer signals depending on control commands to the respective components. The fuel cell controller 29 may be connected to various sensors or acquisition devices and may receive obtained information in a signal form. In the first embodiment of the present disclosure, the fuel cell controller 29 may be electrically connected to the hydrogen temperature acquisition device 24, the tank valve 281, the return valve 282, the return branch valve 283, the fuel cell valve 284, the regulator 25, the external heat exchanger 23, and the hydrogen tank 21 that are included in the fuel cell module 20. As the fuel cell controller 29 is electrically connected with the components, the fuel cell controller 29 may be wiredly connected with the components or may further include a communication module capable of wireless communication to communicate with the components.

The fuel cell module 20 may further include a storage medium, and control commands executed by the fuel cell controller 29 may be stored in the storage medium and may be used. The storage medium may be, but is not limited to, a device such as a hard disk drive (HDD), a solid state drive (SSD), a server, a volatile medium, a non-volatile medium, or the like. In addition, data required for the fuel cell controller 29 to perform tasks may be additionally stored in the storage medium.

When the temperature of the hydrogen obtained by the hydrogen temperature acquisition device 24 is higher than or equal to the upper limit of a predetermined target hydrogen temperature range, the fuel cell controller 29 may perform control to return the hydrogen to the internal heat exchanger through the cooling return line 273 to cool the hydrogen. Furthermore, when the temperature of the hydrogen is lower than or equal to the lower limit of the target hydrogen temperature range, the fuel cell controller 29 may perform control to return the hydrogen to the external heat exchanger 23 through the heating return line 272 to heat the hydrogen. In other words, when it is determined that the hydrogen is not sufficiently heated by the external heat exchanger 23, the hydrogen may be returned to the external heat exchanger 23 so as to be heated by the external heat exchanger 23 again. When it is determined that the hydrogen is excessively heated by the external heat exchanger 23, the hydrogen may be returned to the internal heat exchanger so as to be cooled by the internal heat exchanger. The returned hydrogen may be directly delivered to the first hydrogen line 221.

The fuel cell controller 29 may receive the obtained coolant temperature and the target coolant temperature from the battery controller 17. The fuel cell controller 29 may calculate the hydrogen supply temperature, based on the received information and the final hydrogen temperature required for the fuel cell device 26. This is because when the coolant temperature obtained and the target coolant temperature are known, the amount of heat that the coolant transfers to the hydrogen in the heat exchange module 30 is able to be recognized. Based on the hydrogen supply temperature, the fuel cell controller 29 may control the degree to which the external heat exchanger 23 heats the hydrogen. This is because the external heat exchanger 23 is aimed at heating the hydrogen to the hydrogen supply temperature.

The target hydrogen temperature range may be determined based on the calculated hydrogen supply temperature. The target hydrogen temperature range may have an upper limit obtained by adding a predetermined temperature to the hydrogen supply temperature and a lower limit obtained by subtracting the predetermined temperature from the hydrogen supply temperature.

Heat Exchange Module 30

Figure 2:
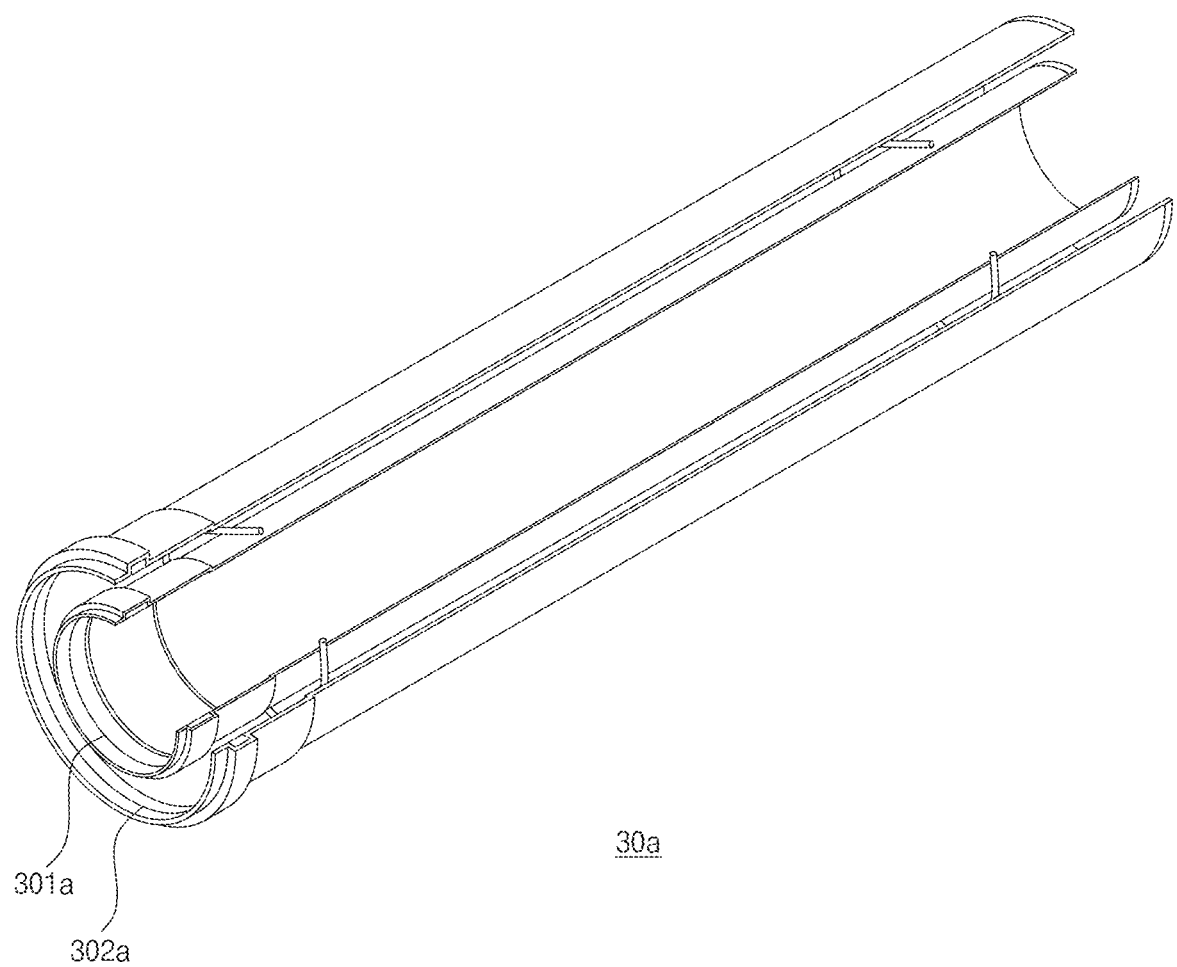
FIG. 2 illustrates an example of a heat exchange module of the fuel cell-battery system according to the first embodiment of the present disclosure.

FIG. 2 illustrates an example 30a of the heat exchange module 30 of the fuel cell-battery system 1 according to the first embodiment of the present disclosure.

The heat exchange module 30 is a component through which the coolant line 12 and the hydrogen line 22 pass such that the coolant is cooled by heat exchange with the hydrogen and the hydrogen is heated by heat exchange with the coolant. The heat exchange module 30 may be various heat exchangers through which the hydrogen and the coolant indirectly exchange heat with each other. For example, the heat exchange module 30 may be one of a coaxial pipe heat exchanger, a fin-tube heat exchanger, and a plate heat exchanger. FIG. 2 illustrates a case in which the example 30a of the heat exchange module 30 is formed of a coaxial pipe heat exchanger. One of the hydrogen and the coolant may flow through an inner pipe 301a, and the other one of the hydrogen and the coolant may flow through an outer pipe 302a surrounding the inner pipe 301a. Accordingly, the hydrogen and the coolant may indirectly exchange heat with each other.

Control Method

Figure 3:
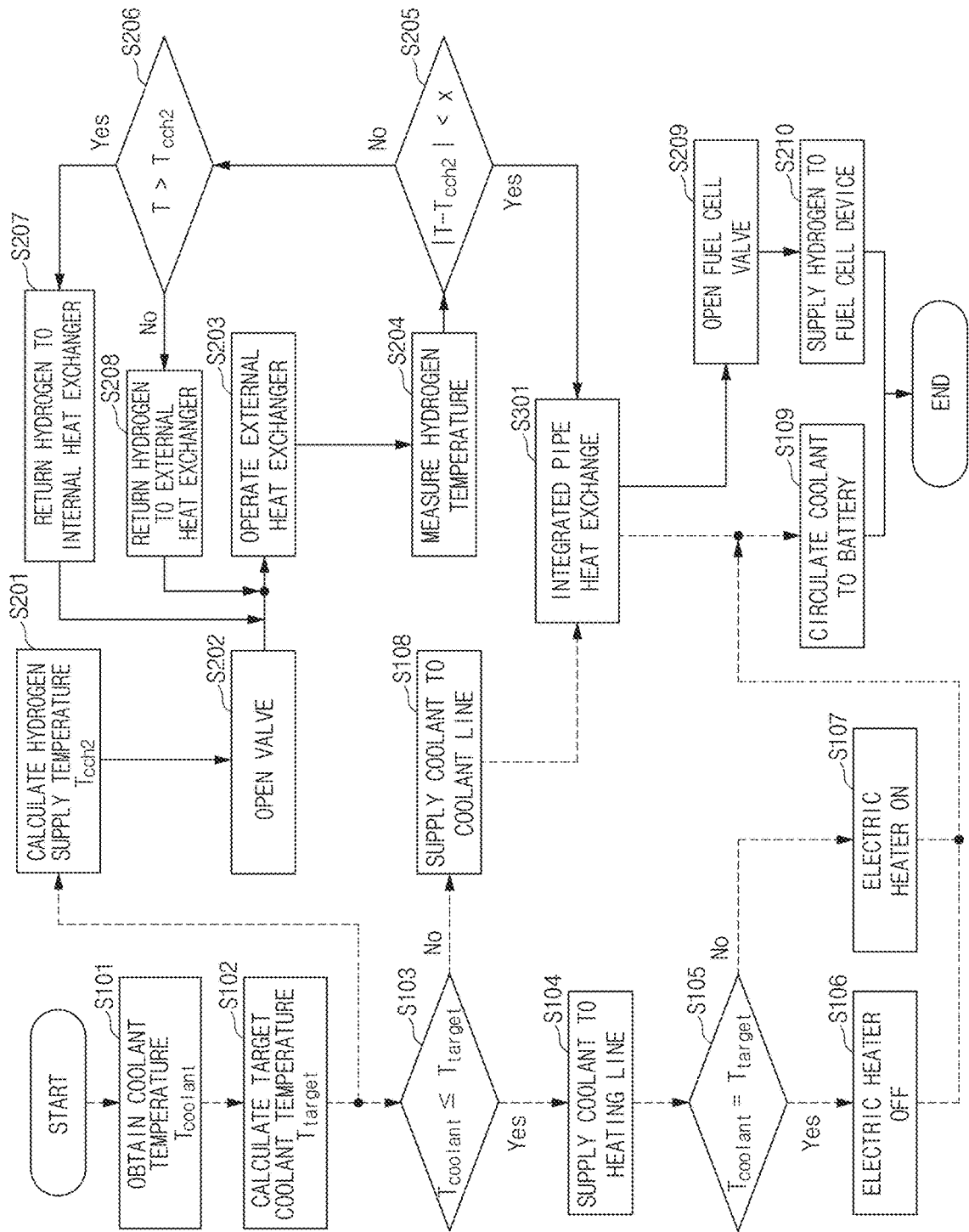
FIG. 3 is a flowchart illustrating a method for controlling the fuel cell-battery system according to the first embodiment of the present disclosure.

FIG. 3 is a flowchart illustrating a method for controlling the fuel cell-battery system 1 according to the first embodiment of the present disclosure.

Referring to FIG. 3, the fuel cell-battery system 1 according to the first embodiment of the present disclosure may be controlled according to the flowchart of FIG. 3. In FIG. 3, solid lines represent control flows in the fuel cell module 20, and dashed lines represent control flows in the battery module 10.

Coolant may start to flow along the coolant line 12. The coolant temperature acquisition device 16 may obtain the temperature of the coolant (S101). The battery controller 17 may receive the obtained coolant temperature from the coolant temperature acquisition device 16. The battery controller 17 may receive the temperature of the battery 11 from the battery temperature acquisition device. The battery controller 17 may monitor the temperature of the battery 11 and may calculate a target coolant temperature, based on the temperature of the battery 11 (S102).

After calculating the target coolant temperature, the battery controller 17 may determine whether the obtained coolant temperature is higher than the target coolant temperature (S103). When the obtained coolant temperature is higher than the target coolant temperature, the battery controller 17 may send the coolant along a second flow path R2 (S108) and may send the coolant to the heat exchange module 30 (S301).

When the obtained coolant temperature is lower than or equal to the target coolant temperature, the battery controller 17 may send the coolant along a first flow path R1 (S104) because the coolant does not need to be cooled. The battery controller 17 may determine whether the obtained coolant temperature is equal to the target coolant temperature (S105). When the obtained coolant temperature is equal to the target coolant temperature, the battery controller 17 may turn off the heater 15 (S106) because the coolant does not need to be heated. When the obtained coolant temperature is not equal to the target coolant temperature, the coolant needs to be heated, and therefore the battery controller 17 may turn on the heater 15 and may allow the coolant to pass through the heater 15 (S107).

The coolant that is cooled or heated or is not subjected to heat treatment may be circulated to the battery 11 (S109).

After calculating the target coolant temperature, the battery controller 17 may transfer the target coolant temperature and the obtained coolant temperature to the fuel cell controller 29. The fuel cell controller 29 may calculate a hydrogen supply temperature, based on the received information and a final hydrogen temperature (S201). The tank valve 281 may be opened (S202), and hydrogen may be released from the hydrogen tank 21. The hydrogen flowing along the hydrogen line 22 may be heated through the external heat exchanger 23 (S203). The hydrogen temperature acquisition device 24 may obtain the temperature of the hydrogen heated by the external heat exchanger 23 (S204). The hydrogen temperature acquisition device 24 may transfer the obtained hydrogen temperature to the fuel cell controller 29, and the fuel cell controller 29 may determine whether the absolute value of the difference between the obtained hydrogen temperature and the hydrogen supply temperature is smaller than a predetermined temperature value x (S205). In other words, the fuel cell controller 29 may determine whether the obtained hydrogen temperature is within a target hydrogen temperature range having a magnitude two times greater than the predetermined temperature value x, with the hydrogen supply temperature as the center of the target hydrogen temperature range.

The predetermined temperature value x is a value that determines how accurately the temperature of the hydrogen supplied is to be controlled. The predetermined temperature value x needs to be set at a level at which the temperature of the hydrogen passing through the heat exchange module 30 does not affect the performance of the fuel cell device 26. The predetermined temperature value x may vary depending on the specification of the fuel cell device 26. The predetermined temperature value x may, for example, be 5° C.

When the absolute value is greater than or equal to the predetermined temperature value x, the fuel cell controller 29 may determine whether the obtained hydrogen temperature is higher than the hydrogen supply temperature (S206). When the obtained hydrogen temperature is higher than the hydrogen supply temperature, the hydrogen may be returned to the internal heat exchanger through the cooling return line 273 and may be cooled by the internal heat exchanger (S207). The returned hydrogen may be supplied to the external heat exchanger 23 again (S203).

When the obtained hydrogen temperature is lower than the hydrogen supply temperature, the hydrogen may be returned to the external heat exchanger 23 through the heating return line 272 (S208) and may be heated by the external heat exchanger 23 (S203).

When the absolute value is smaller than the predetermined temperature value x, the hydrogen may be supplied to the heat exchange module 30 without change (S301). The fuel cell valve 284 may be opened (S209), and the heated hydrogen may be supplied to the fuel cell device 26 (S210).

Second Embodiment

Figure 4:
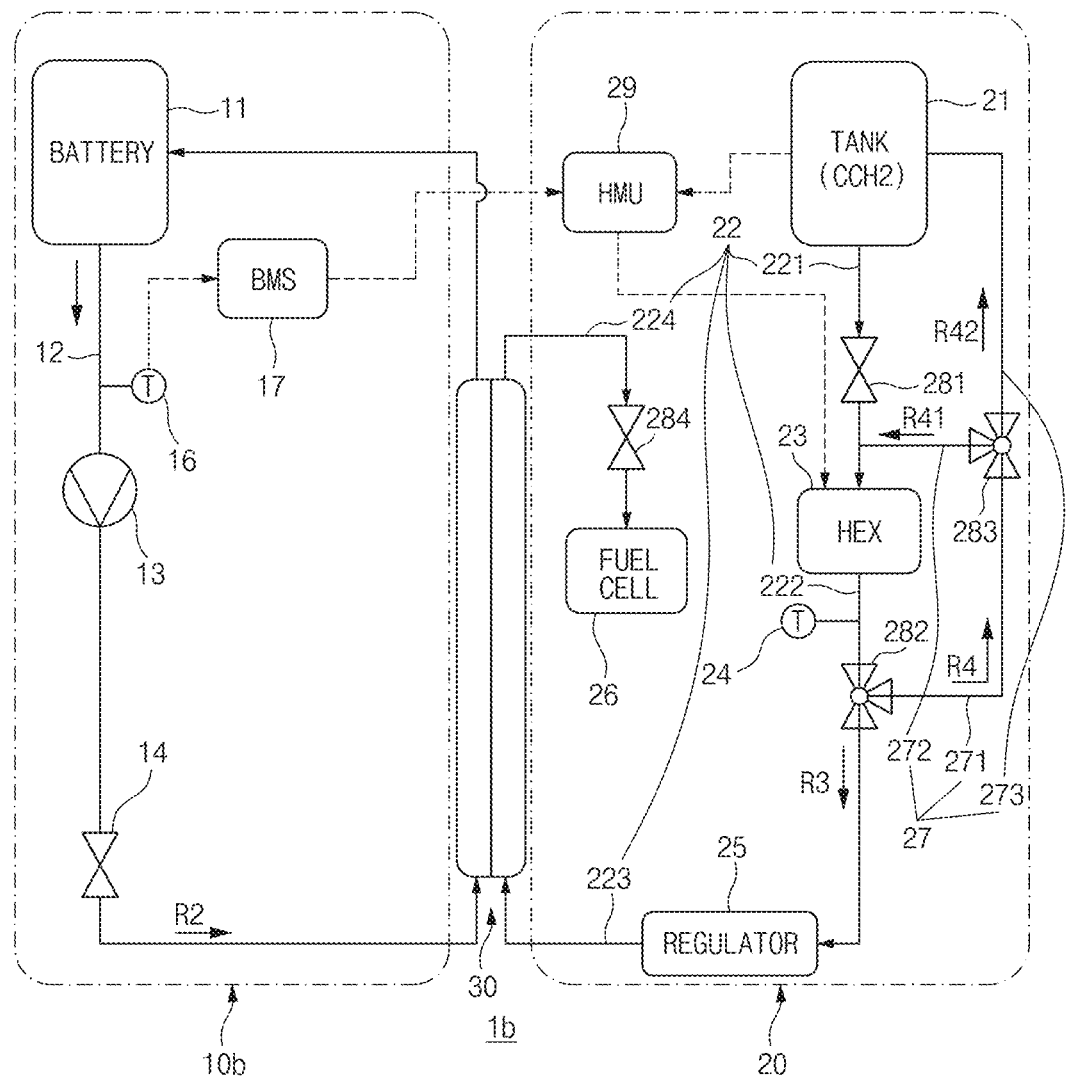
FIG. 4 is a schematic view of a fuel cell-battery system according to a second embodiment of the present disclosure.

FIG. 4 is a schematic view of a fuel cell-battery system 1b according to a second embodiment of the present disclosure.

Referring to FIG. 4, the fuel cell-battery system 1b according to the second embodiment of the present disclosure is almost the same as the fuel cell-battery system 1 according to the first embodiment. However, the fuel cell-battery system 1b differs from the fuel cell-battery system 1 in that a battery module 10b does not include a heater and a heating line. In this case, a fuel cell controller 29 may set a hydrogen supply temperature to a temperature higher than the hydrogen supply temperature in the first embodiment and may control an external heat exchanger 23. In the second embodiment, the hydrogen supply temperature may be higher than a final hydrogen temperature.

Third Embodiment

Figure 5:
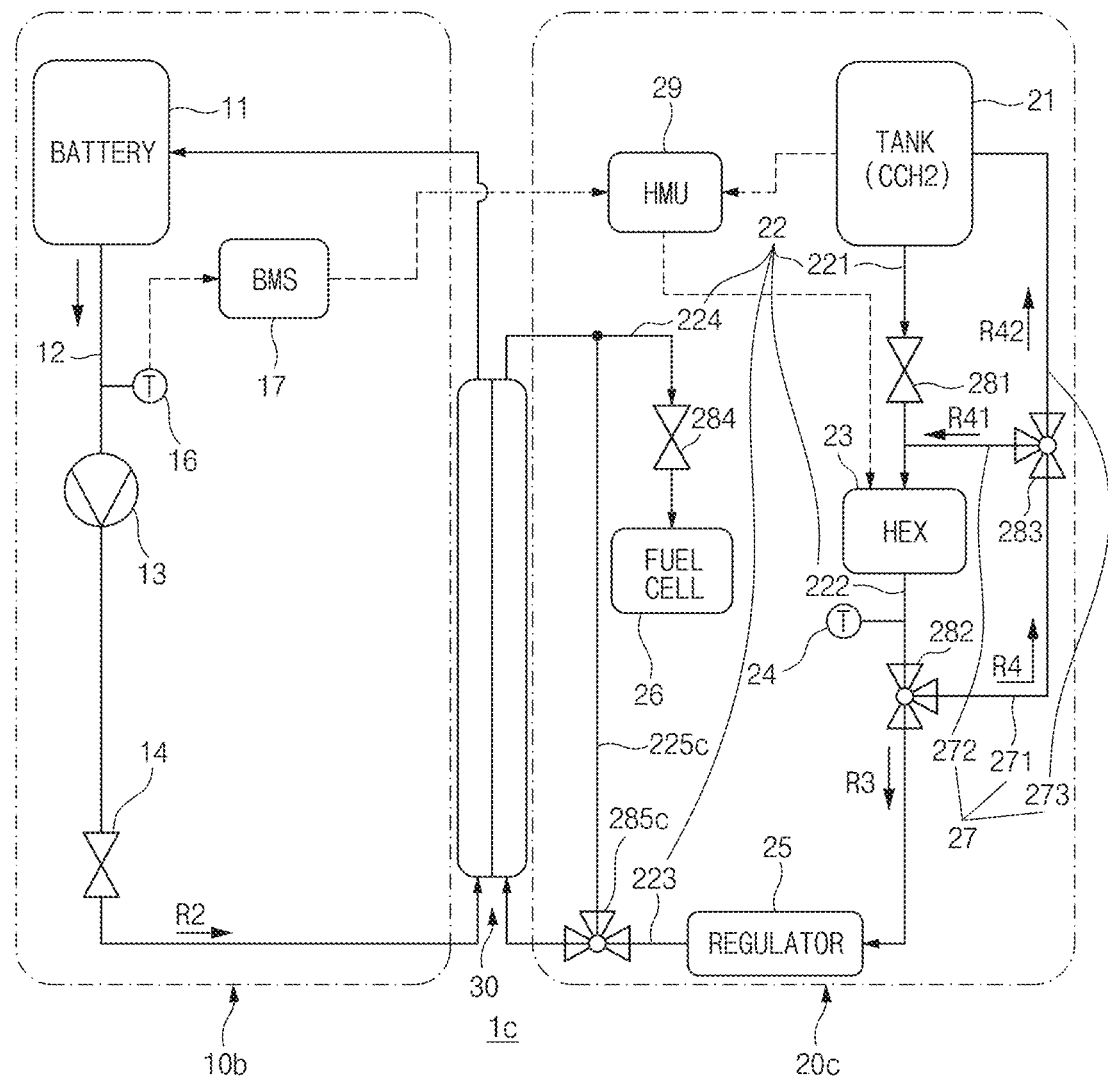
FIG. 5 is a schematic view of a fuel cell-battery system according to a third embodiment of the present disclosure.

FIG. 5 is a schematic view of a fuel cell-battery system 1c according to a third embodiment of the present disclosure.

Referring to FIG. 5, the fuel cell-battery system 1c according to the third embodiment of the present disclosure is almost the same as the fuel cell-battery system 1b according to the second embodiment. However, the fuel cell-battery system 1c differs from the fuel cell-battery system 1b in that a fuel cell module 20c further includes a bypass line 225c and a bypass valve 285c. The bypass line 225c may be provided such that hydrogen flowing in a third hydrogen line 223 is bypassed to a fuel cell device 26 before entering a heat exchange module 30. When an obtained coolant temperature is higher than a target coolant temperature, a fuel cell controller 29 may control the bypass valve 285c such that the hydrogen passes through the heat exchange module 30. When the coolant temperature obtained is lower than or equal to the target coolant temperature, the fuel cell controller 29 may control the bypass valve 285c such that the hydrogen flows along the bypass line 225c. The bypass valve 285c may be a three-way valve.

When the hydrogen is bypassed to the bypass line 225c, coolant may not be cooled in the heat exchange module 30. In other words, the temperature of the coolant may not be determined by using the heater 15 and the heat exchange module 30 as in the first embodiment but may be determined by controlling the supply of the hydrogen to the heat exchange module 30 in the third embodiment.

Fourth Embodiment

Figure 6:
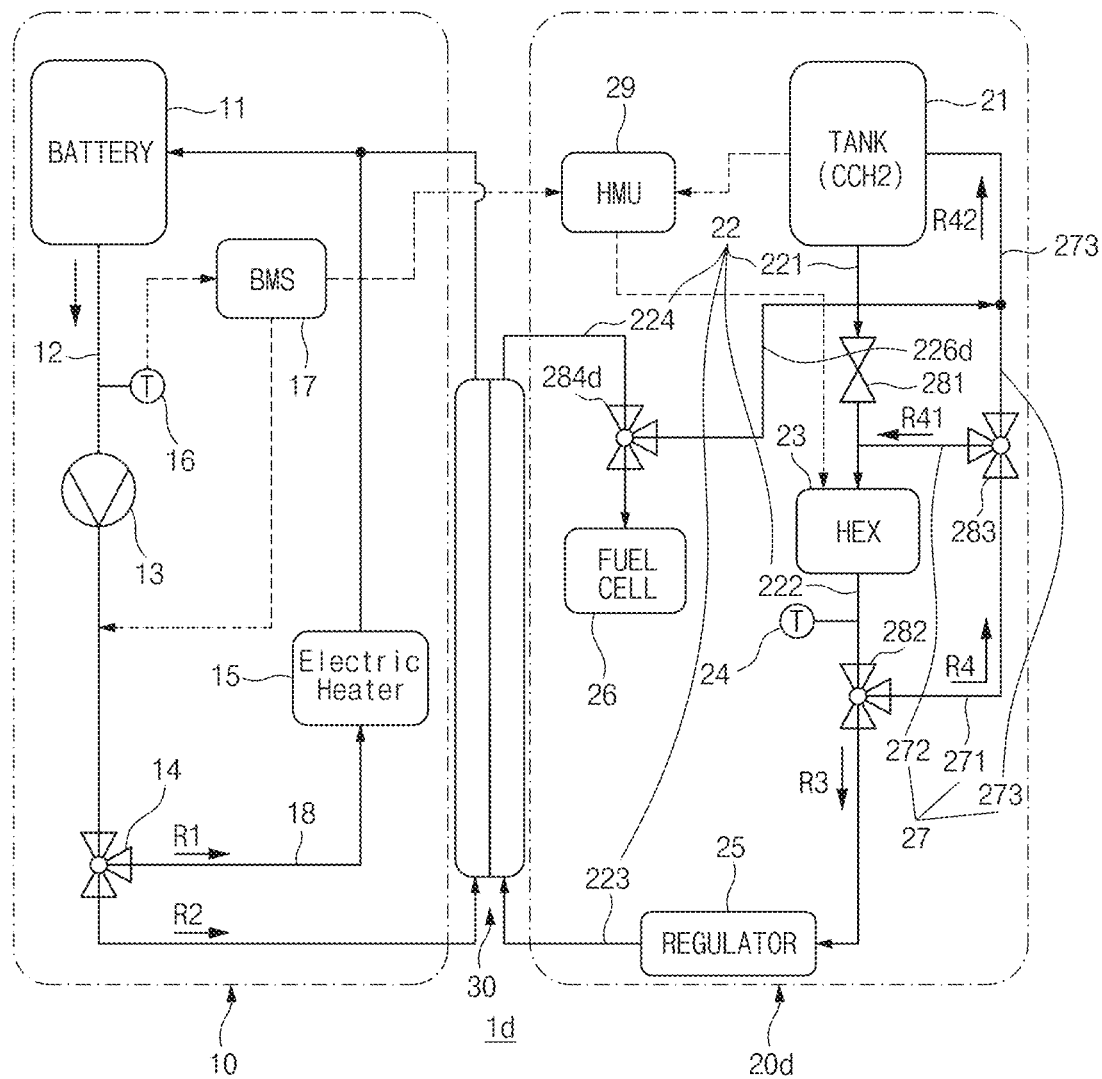
FIG. 6 is a schematic view of a fuel cell-battery system according to a fourth embodiment of the present disclosure.

FIG. 6 is a schematic view of a fuel cell-battery system 1d according to a fourth embodiment of the present disclosure.

Referring to FIG. 6, the fuel cell-battery system 1d according to the fourth embodiment of the present disclosure is almost the same as the fuel cell-battery system 1 according to the first embodiment. However, the fuel cell-battery system 1d differs from the fuel cell-battery system 1 in that a fuel cell module 20d further includes a circulation line 226d and the circulation line 226d is connected to a hydrogen line 22 by a fuel cell valve 284d.

The circulation line 226d may return hydrogen to a hydrogen tank 21 before the hydrogen enters a fuel cell device 26 after passing through a heat exchange module 30. One end of the circulation line 226d may be connected to a fourth hydrogen line 224 by the fuel cell valve 284d, and an opposite end of the circulation line 226d may be connected to a cooling return line 273. The fuel cell valve 284d may be a three-way valve that allows the hydrogen to be delivered to the fuel cell device 26 through the fourth hydrogen line 224 or allows the hydrogen to return through the circulation line 226d. Accordingly, when a battery module 10 is heated without the use of hydrogen in a high-temperature area, hydrogen may be used only for cooling coolant without production of electric power by the fuel cell device 26.

Fifth Embodiment

Figure 7:
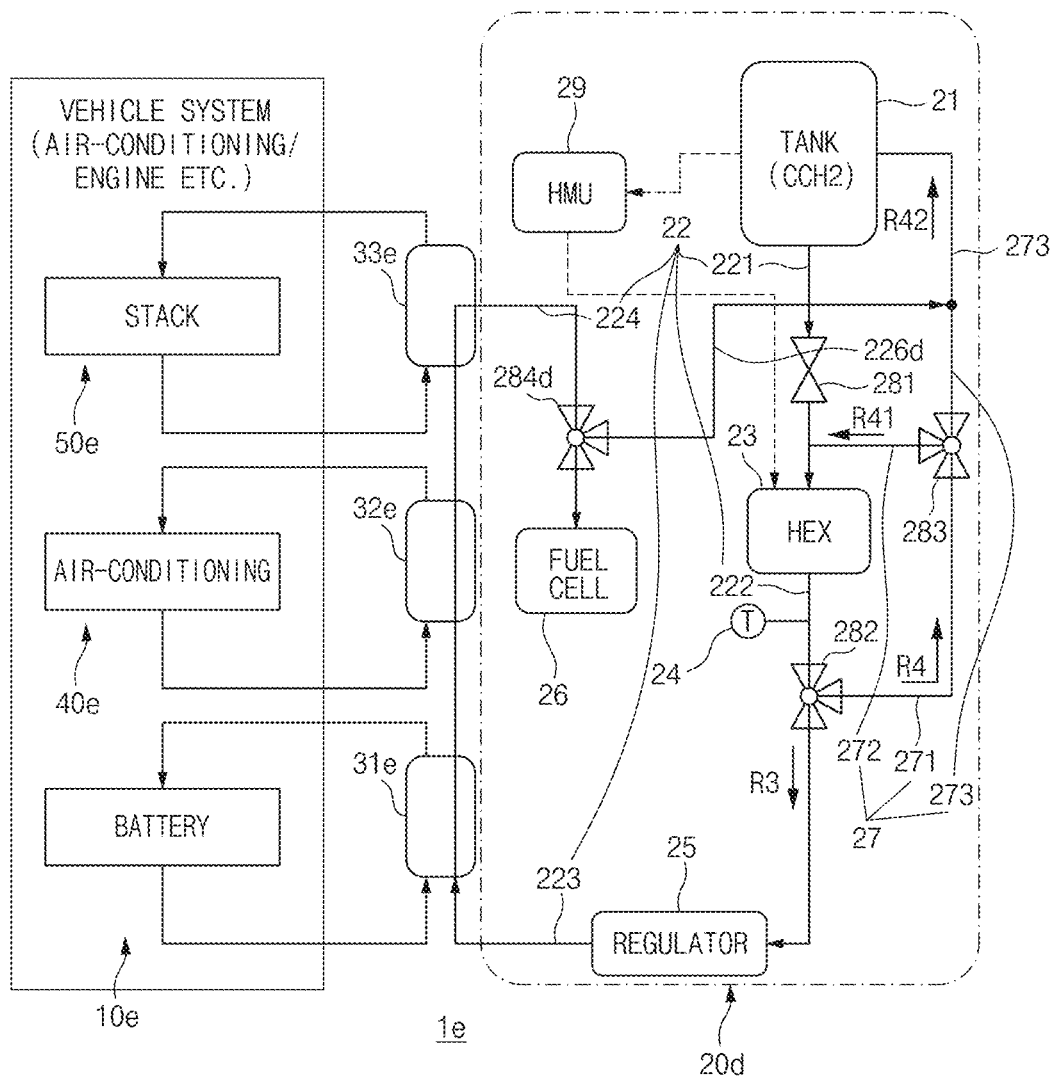
FIG. 7 is a schematic view of a fuel cell-battery system according to a fifth embodiment of the present disclosure.

FIG. 7 is a schematic view of a fuel cell-battery system 1e according to a fifth embodiment of the present disclosure.

Referring to FIG. 7, the fuel cell-battery system 1e according to the fifth embodiment of the present disclosure is almost the same as the fuel cell-battery system 1d according to the fourth embodiment. However, the fuel cell-battery system 1e differs from the fuel cell-battery system 1d in that a heat exchange module 30e includes a main heat exchange module 31e and additional heat exchange modules 32e and 33e.

The main heat exchange module 31e allows coolant of a battery module 10e and hydrogen of a fuel cell module 20d to exchange heat with each other. The additional heat exchange modules 32e and 33e allow coolant of at least one of a vehicle air-conditioning system 40e, a fuel cell stack 50e, or an engine to exchange heat with hydrogen of the fuel cell module 20d. Although the first additional heat exchange module 32e and the second additional heat exchange module 33e connected to the vehicle air-conditioning system 40e and the fuel cell stack 50e, respectively, are illustrated in FIG. 7, the number of additional heat exchange modules is not limited thereto.

As described above, the fuel cell-battery systems according to the embodiments of the present disclosure may efficiently perform heat exchange, thereby enabling efficient use of heat and supply of coolant and fuel at appropriate temperatures.

Hereinabove, even though all of the components are coupled into one body or operate in a combined state in the description of the above-mentioned embodiments of the present disclosure, the present disclosure is not limited to these embodiments. In other words, all of the components may operate in one or more selective combination within the range of the purpose of the present disclosure. It should be also understood that the terms of "include", "comprise" or "have" in the specification are "open type" expressions just to say that the corresponding components exist and, unless specifically described to the contrary, do not exclude but may include additional components. Unless otherwise defined, all terms used herein, including technical and scientific terms, have the same meaning as those generally understood by those having ordinary skill in the art to which the present disclosure pertains. Such terms as those defined in a generally used dictionary are to be interpreted as having meanings equal to the contextual meanings in the relevant field of art and are not to be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or to perform that operation or function. Further, the controller described herein may include a processor programmed to perform the noted operation, function, or the like.

Hereinabove, although the present disclosure has been described with reference to specific embodiments and the accompanying drawings, the present disclosure is not limited thereto, but may be variously modified and altered by those having ordinary skill in the art to which the present disclosure pertains without departing from the spirit and scope of the present disclosure claimed in the following claims. Therefore, the specific embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A fuel cell-battery system comprising:
a battery module including a battery configured to store electric power and a coolant line through which coolant circulates to cool the battery;
a fuel cell module including a hydrogen tank configured to store hydrogen, a fuel cell configured to produce the electric power using the hydrogen, and a hydrogen line configured to connect the hydrogen tank and the fuel cell to deliver the hydrogen from the hydrogen tank to the fuel cell; and a heat exchange module through which the coolant line and the hydrogen line pass such that the coolant is cooled by heat exchange with the hydrogen and the hydrogen is heated by heat exchange with the coolant, wherein the fuel cell module further includes
an external heat exchanger disposed on the hydrogen line between the heat exchange module and the hydrogen tank and configured to heat the hydrogen flowing in the hydrogen line, and
a return line configured to return the hydrogen passing through the external heat exchanger to an upstream side of the external heat exchanger with respect to a direction in which the hydrogen flows in the hydrogen line.

2. The fuel cell-battery system of claim 1, wherein the battery module further includes:
a heater configured to heat the coolant; and
a heating line configured to pass through the heater to heat the coolant.

3. The fuel cell-battery system of claim 2, wherein the battery module further includes:
a coolant temperature acquisition device configured to obtain temperature of the coolant released from the battery; and
a battery controller electrically connected with the coolant temperature acquisition device and the heater, and
wherein the battery controller:
performs control such that the coolant flows along the coolant line and the heater stops operating, when the obtained coolant temperature is higher than a target coolant temperature; and
performs control such that the coolant flows along the heating line and the heater operates, when the obtained coolant temperature is lower than the target coolant temperature.

4. The fuel cell-battery system of claim 3, wherein the battery controller performs control such that the coolant flows along the heating line and the heater stops operating, when the obtained coolant temperature is equal to the target coolant temperature.

5. The fuel cell-battery system of claim 1, wherein the fuel cell module further includes:
a hydrogen temperature acquisition device configured to obtain temperature of the hydrogen passing through the external heat exchanger; and
a fuel cell controller electrically connected with the hydrogen temperature acquisition device,
wherein the hydrogen tank includes a hydrogen reservoir in which the hydrogen is stored and an internal heat exchanger through which the hydrogen reservoir and an introduced material exchange heat with each other, and
wherein the fuel cell controller:
returns the hydrogen to the internal heat exchanger through the return line to cool the hydrogen, when the obtained hydrogen temperature is higher than or equal to an upper limit of a target hydrogen temperature range; and
returns the hydrogen to the external heat exchanger through the return line to heat the hydrogen, when the obtained hydrogen temperature is lower than or equal to a lower limit of the target hydrogen temperature range.

6. A fuel cell-battery system comprising:
a battery module including a battery configured to store electric power and a coolant line through which coolant circulates to cool the battery;
a fuel cell module including a hydrogen tank configured to store hydrogen, a fuel cell configured to produce the electric power using the hydrogen, and a hydrogen line configured to connect the hydrogen tank and the fuel cell to deliver the hydrogen from the hydrogen tank to the fuel cell; and
a heat exchange module through which the coolant line and the hydrogen line pass such that the coolant is cooled by heat exchange with the hydrogen and the hydrogen is heated by heat exchange with the coolant,
wherein the battery module further includes a coolant temperature acquisition device configured to obtain temperature of the coolant released from the battery and a battery controller electrically connected with the coolant temperature acquisition device,
wherein the fuel cell module further includes a bypass line through which the hydrogen in the hydrogen line is bypassed to the fuel cell before entering the heat exchange module and a fuel cell controller electrically connected to the coolant temperature acquisition device and the battery controller, and
wherein the fuel cell controller
allows the hydrogen to pass through the heat exchange module, when the obtained coolant temperature is higher than a target coolant temperature and
allows the hydrogen to flow along the bypass line, when the obtained coolant temperature is lower than or equal to the target coolant temperature.

7. The fuel cell-battery system of claim 1, wherein the fuel cell module further includes a circulation line through which the hydrogen returns to the hydrogen tank before the hydrogen enters the fuel cell after passing through the heat exchange module.

8. The fuel cell-battery system of claim 1, wherein the fuel cell module further includes a regulator disposed in the hydrogen line and configured to reduce pressure of the hydrogen flowing in the hydrogen line to locate the pressure of the hydrogen to be supplied to the fuel cell within a predetermined pressure range.

9. The fuel cell-battery system of claim 1, wherein the heat exchange module is one of a coaxial pipe heat exchanger, a fin-tube heat exchanger, and a plate heat exchanger that are formed such that the hydrogen and the coolant indirectly exchange heat with each other.

10. The fuel cell-battery system of claim 1, wherein the heat exchange module includes:
a main heat exchange module through which coolant of the battery module and hydrogen of the fuel cell module exchange heat with each other; and
an additional heat exchange module through which coolant of at least one of a vehicle air-conditioning system, a fuel cell stack, or an engine exchanges heat with hydrogen of the fuel cell module.

11. The fuel cell-battery system of claim 1, wherein the storage tank is a cryo-compressed hydrogen storage.

* * * * *